United States Patent Office 3,487,063
Patented Dec. 30, 1969

3,487,063
METHOD OF POLYMERIZING BUTADIENE OR BUTADIENE IN MIXTURE WITH OTHER DIOLEFINS
Morford C. Throckmorton, Akron, and Carl E. Gordon, Stow, Ohio, assignors to The Goodyear Tire & Rubber Company, Akron, Ohio, a corporation of Ohio
No Drawing. Filed Dec. 15, 1967, Ser. No. 690,766
Int. Cl. C08d 1/26, 1/32
U.S. Cl. 260—94.3          11 Claims

ABSTRACT OF THE DISCLOSURE

An improvement in methods and catalyst systems for the solution polymerization of butadiene and butadiene in mixture with other diolefins to form polymers containing a high content of cis-1,4 addition and possessing a high molecular weight. In the solution polymerization of butadiene or butadiene in mixture with other diolefins which is carried out under conventional polymerization conditions, a catalyst is employed which is a mixture of (1) an organometallic compound of metals of Groups I, II and III of the Periodic System, (2) at least one compound selected from the group consisting of organonickel and organocobalt compounds and (3) at least one compound selected from the class consisting of boron trifluoride and complexes of boron trifluoride prepared by complexing boron trifluoride with one or more electron donating compounds, the said improvement being the addition to the aforementioned catalyst of relatively small amounts of carbon disulfide. The addition of the carbon disulfide to such catalysts and the subsequent employment of the modified catalyst provides an increase in the molecular weight of the resulting polymer.

---

This invention relates to the polymerization of butadiene and butadiene in mixture with other conjugated diolefins. More particularly it relates to an improved polymerization process for the polymerization of butadiene and butadiene in mixture with other diolefins to produce polymers containing a high degree of stereoregularity and high molecular weight.

Polymers of butadiene and butadiene in mixture with other conjugated diolefins containing a high proportion of the butadiene units in a cis-1,4 configuration possess properties which make them useful as synthetic rubbers in the manufacture of various rubber products including tires.

Polybutadiene made by certain accepted processes result in polymers with a relatively high cis-1,4 configuration. However, many of these polymers possess only, what might be termed medium molecular weights. For example, it is known to produce a high cis-1,4 polybutadiene by a ternary catalyst system comprising (1) triethylaluminum, (2) an organonickel salt and (3) boron trifluoride diethyl ether complex. Such a polymer possesses a very high cis-1,4 molecular structure analyzing about 97 to 98% cis-1,4 content. However, at the normal catalyst concentrations and ratios of catalyst components, polymers possessing only medium molecular weight are obtained. It has been found, however, that when such a catalyst system is modified according to the practice of this invention, the number average molecular weight of the resulting polymer may be more than double that produced by the unmodified catalyst system.

Thus, according to the invention, improvements are obtained in a process in which butadiene or butadiene in mixture with other conjugated diolefins is polymerized, under solution polymerization conditions, with a catalyst system comprising (1) at least one organometallic compound in which the metal is selected from Groups I, II and III of the Periodic System, (2) at least one organometallic compound selected from the class of organonickel and organocobalt compounds and (3) at least one compound selected from the class consisting of boron trifluoride and boron trifluoride complexes prepared by complexing boron trifluoride with an electron donating compound, the said improvement being effected by the addition to said catalyst system of from about 0.05 to about 15.0 moles of carbon disulfide per mole of nickel or cobalt catalyst component, the polymerization resulting in polymers containing increased average molecular weights.

The organometallic compounds wherein the metals are selected from Groups I, II and III of the Periodic System are organocompounds of such metals as lithium, sodium, potassium, rubidium, cesium, magnesium, calcium, strontium, beryllium, barium, zinc, cadmium, mercury, aluminum, gallium and indium. The term "organometallic" as used here to refer to compounds, indicates that metals of Groups I, II and III of the Periodic System are attached directly to a carbon atom of alkyl, cycloalkyl, aryl, arylalkyl and alkaryl radicals. All of the above compounds may be used in the practice of this invention.

When considering the organometallic compounds containing metals from Groups I, II and III, it is preferred for this invention to use organoaluminum compounds, organomagnesium compounds, organozinc compounds and organolithium compounds.

By the term "organoaluminum compound" is meant any organoaluminum compound responding to the formula

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride, and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, and other organoaluminum hydrides. Also included are diethylethoxyaluminum and dipropylethoxyaluminum. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first any organomagnesium complex responding to the formula $R_aMgX_b$ where R may be alkyl, aryl, arylalkyl or alkaryl; X is a halogen, and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex.

Such compounds are usually prepared in the absence of ether.

Also, "organomagnesium compounds" means any organomagnesium compound or any organomagnesium halide of the Gridnard type corresponding to the formulas $R_2Mg$ or $RMgY$ where R may be alkyl, aryl, arylalkyl or alkaryl and Y is fluorine or $R'R''Mg$ where R' may be alkyl, aryl, or alkaryl and R'' may be either alkyl, aryl, arylalkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the fromula $R_3Zn$ where R may be alkyl, aryl, alkaryl or arylalkyl. Representative among such compounds are diethylzinc, dibutylzinc or diphenylzinc.

By the term "organolithium compounds" is any organolithium compound responding to the formula R—Li where R is an alkyl, alkaryl, arylalkyl or aryl group. Representative among the components responding to the formula set forth above are ethyllithium, propyllithium, n-, sec- or t-butyllithium, hexyllithium, styryllithium or phenyllithium. Also the organolithiumaluminum compounds may be used. These compounds respond to the formula $R'R''_3LiAl$ where R' and R'' may be alkyl, alkaryl or arylalkyl groups and R' and R'' may or may not be the same group. Representative of these compounds are n-butyltriisobutyllithium aluminum, tetrabutyllithium aluminum, butyltriethyllithium aluminum and tetraisobutyllithium aluminum.

Representative of other organometallic compounds with metals selected from Groups I, II and III of the Periodic System are compounds containing at least one of the metals, sodium, potassium, calcium, beryllium, cadmium and mercury combined with at least one organic radical selected from the group consisting of alkyls, alkaryls, arylalkyls and aryls.

The second component of the catalyst system of this invention is an organometallic compound which contains nickel and/or cobalt. The compound may be any organonickel compound or any organocobalt compound. It is preferred to employ soluble compounds of nickel and/or cobalt. These soluble compounds of nickel and/or cobalt are usually compounds of the said metals with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvent. Thus, any nickel salt and/or cobalt salt of an organic acid, containing from about 1 to 20 carbon atoms may be employed.

Representative of such organonickel compounds are nickel benzoate, nickel acetate, nickel naphthenate, bis(alpha furyl dioxime)nickel, nickel octanoate, nickel palmitate, nickel stearate, nickel acetylacetonate, bis(salicylaldehyde) ethylene diimine nickel and nickel salicylaldehyde. Nickel tetracarbonyl also may be employed as the nickel containing catalyst in this invention. The preferred component containing nickel is a nickel salt of a carboxylic acid or an organic complex compound of nickel.

Representative of such organocobalt compounds are cobalt benzoate, cobalt acetate, cobalt naphthenate, bis(alpha furyl dioxime)cobalt, cobalt octanoate, cobalt jalmitate, cobalt stearate, cobalt acetylacetonate, bis(salicylaldehyde ethylene diamine) cobalt and cobalt salicylaldehyde. Dicobalt octacarbonyl also may be employed as the cobalt containing catalyst in this invention. The preferred component containing cobalt is a cobalt salt of carboxylic acid or an organic complex compound of cobalt.

The third component of the catalyst system is boron trifluoride or a boron trifluoride complex prepared by complexing boron trifluoride with a member of the class of compounds which will readily donate electrons and result in the formation of boron trifluoride complex compounds. The boron trifluoride molecule has a strong tendency to accept electrons from donor molecules. Hence, boron trifluoride complexes can be formed from a large number of electron donating compounds among which the following are representative but by no means exclusive of such electron donating compounds: water, phosphoric acid, acetic acid, methyl alcohol, butyl alcohol, diethyl ether, dibutyl ether, tetrahydrofuran, phenol, p-cresol, tricresyl phosphate, benzaldehyde, sulfuric acid, benzophenone, ethyl benzoate, phenyl acetate and benzonitrile.

When not available commercially, many of the boron trifluoride complexes can be readily formed by directly contacting boron trifluoride gas (a colorless gas at ordinary temperatures and pressures, its boiling point being $-101°$ C.) with the compound used as the complexing agent, that is, the electron donor compound. This contact is accomplished with a reacting apparatus combined with a sensitive weighing mechanism in order to achieve the desired mole ratios between the $BF_3$ and the electron donor compound. The reaction is carried out under an inert atmosphere. The reaction environment may consist only of the reacting components, $BF_3$ gas and the electron donor compound, or when convenient, the reaction may be carried out in the medium of an inert organic diluent.

The addition of carbon disulfide to such a catalyst system and the use of that catalyst system to polymerize butadiene or butadiene in mixture with other diolefins, results in an unexpected increase in the molecular weight of the final polymer. The amount of carbon disulfide employed in this invention can vary considerably. Of course a sufficient amount must be employed to obtain some increase in molecular weight of the resulting polymer. Thus, no lower limit can be specified. However, it has been determined that when an excess of carbon disulfide is employed, even though a significant increase in molecular weight is obtained, this excess carbon disulfide usually will result in a decrease in the reaction rate. It has been determined that good results can be obtained when from about 0.05 mole to about 15.0 moles of carbon disulfide per mole of organo nickel and/or organo cobalt catalyst component, is employed.

The three component catalyst system previously mentioned to which the improvement comprising this invention is applied, has shown polymerization activity over a wide range of catalyst concentration. Apparently, the three catalyst components interact to form the active catalyst. As a result, the optimum concentration for any one catalyst component is dependent upon the concentration of each of the other catalyst components. Although polymerization will occur over a wide range of catalyst concentrations and ratios, polymers having the most desirable properties are obtained over a more narrow range. It has been found that polymerization will occur when the mole ratio of the organometallic compound in which the metal is selected from Groups I, II and III of the Periodic System (Me) to the organonickel compound (Ni) ranges from about 0.3/1 to about 500/1, and when the mole ratio of the boron trifluoride and/or boron trifluoride complex prepared by complexing boron trifluoride with a member of the class consisting of electron donating compounds ($BF_3$·complex) to the organonickel compound (Ni) ranges from about 0.33/1 to about 300/1, and where the mole ratio of the organometallic compound of Groups I, II and III metals (Me) to the $BF_3$·complex ranges from about 0.1/1 to about 4/1.

The preferred Me/Ni mole ratio ranges from about 1/1 to about 150/1; the preferred BF$_3$·complex/Ni mole ratio ranges from about 1/1 to about 150/1; and the preferred Me/BF$_3$·complex mole ratio ranges from about 0.3/1 to about 1.4/1.

When organocobalt compounds replace organonickel compounds or mixtures or organonickel and organocobalt are used as the second catalyst component in the ternary system of this invention, the mole ratio of cobalt (Co) and/or nickel (Ni) to the other catalyst components are similar to those of nickel (Ni) shown above.

The three catalyst components may be charged to the polymerization system as separate catalyst components in either a stepwise or a simultaneous manner, sometimes called "in situ." The catalyst may also be "preformed" outside the polymerization system whereby all the catalyst components are mixed in the absence of the butadiene, either with or without an inert diluent and the complete blend then added to the polymerization system.

An improved preformed catalyst system can be prepared by having a small amount of a diolefin, for example butadiene or isoprene, present when the catalyst components, Me, Ni and BF$_3$ are mixed together. The diolefin apparently reacts with the catalyst components to form a catalyst complex which is more active, particularly when the polymerization system contains impurities, than either the in situ catalyst (which is prepared in the presence of a very large amount of monomer) or the simple preformed catalyst prepared in the absence of the diolefin. The improved preformed catalyst may be prepared by dissolving a small amount of diolefin in a hydrocarbon solvent such as benzene or hexane, and then adding the Me component, the Ni component and then the BF$_3$·complex component to the solvent.

The particular order of addition may be varied somewhat but it is advantageous to have (1) the diolefin present before the addition of both Me and Ni components and (2) the Ni component present before the addition of both Me and BF$_3$·complex catalyst components. The amount of the diolefin which can be present to form the improved preformed catalyst can be varied over a wide range, and of course, is somewhat dependent on the other catalyst concentrations. However, the amount of diolefin, preferably butadiene, used to prepare the preformed catalyst should be between about 0.001 and 3% of the total amount of monomer to be polymerized. Based upon catalyst mole ratios, the diolefin to the Ni mole ratio should be between about 0.5/1 and 1000/1, and preferably between about 2/1 and 100/1.

The concentration of the total catalyst system employed depends on factors such as purity of the system, polymerization rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperature employed in the practice of this invention has not been found to be critical and may vary from a low temperature such as $-10°$ C. or below up to high temperatures of 100° C. or higher. However, a more desirable temperature range is between about 30° C. and about 90° C. Ambient pressures are usually used but higher or lower pressures may be employed.

The practice of this invention is further illustrated by reference to the following examples which are intended to be representative rather than restrictive of the scope of this invention.

EXAMPLE I

Purified butadiene/benzene solutions containing 10 grams of butadiene per hundred milliliters of solution were placed in 4 ounce reactors. Nitrogen was flushed over the surface of each of these. The catalyst components were added by the in situ method. Triethyl aluminum in the amount of 0.06 millimole per 10 grams of butadiene was added followed by nickel octanoate in the amount of 0.005 millimole and then boron trifluoride diethyl ether complex in the amount of 0.075 millimole was charged to the reactor. Carbon disulfide was added in varying amounts as indicated in the table below reported in millimoles per 10 grams of butadiene. The results of these polymerizations which were conducted at 50° C. are reported in this table. In the table, column 1 is the experiment number; column 2 is the amount of carbon disulfide employed, if any; column 3 is the yield or conversion in weight percent; column 4 is the polymerization time in hours; and column 5 is the dilute solution viscosity and is a measure or an indication of molecular weight. The higher the number the greater the molecular weight.

| No. | CS$_2$ | Yield | Time | DSV |
|---|---|---|---|---|
| 1 | None | 89.7 | 22 | 2.42 |
| 2 | 0.00065 | 93.4 | 16 | 3.24 |
| 3 | 0.00065 | 90.2 | 22 | 3.21 |
| 4 | 0.0027 | 77.0 | 19 | 3.60 |
| 5 | 0.012 | 79.2 | 22 | 4.62 |
| 6 | 0.023 | 48.0 | 44 | 5.04 |

Run No. 1 is considered a control and when analyzed by conventional means, exhibited a cis-1,4 content of 97.2%, a trans-1,4 content of 1.3% and a 1,2-content of 1.5%. When the molecular weight was determined by conventional osmotic pressure method, the number average molecular weight was determined to be 71,400. The infrared analysis of Run No. 4 indicated the polymer to have a cis-1,4 content of 96.8%, a trans-1,4 content of 1.2% and a 1,2-content of 2%. Run No. 6 when analyzed had a cis-1,4 content of 97.7%, a trans-1,4 content of 0.9% and a 1,2-content of 1.4%. The number average molecular weight was determined on the polymer resulting from Run No. 5 and was determined to be 167,000.

EXAMPLE II

Butadiene was polymerized in the manner outlined in Example I except that the concentration of nickel octanoate was increased to 0.01 millimole per 10 grams of butadiene and boron trifluoride phenolate was substituted for the boron trifluoride diethyl ether complex. The polymerization time was 21 hours for all of these experiments. The results obtained are reported in the table wherein column 1 is the experiment number; column 2 is the amount of carbon disulfide added in millimoles per 10 grams of butadiene; column 3 is the mole ratio of carbon disulfide to the nickel octanoate; column 4 is the yield in weight percent and column 5 is the dilute solution viscosity.

| No. | $CS_2$ | $CS_2/Ni$ | Yield | DSV |
|---|---|---|---|---|
| 1 | 0.001 | 0.10 | 98 | 3.14 |
| 2 | 0.025 | 0.25 | 98 | 3.75 |
| 3 | .005 | 0.50 | 96 | 3.92 |
| 4 | .01 | 1.00 | 97 | 3.86 |
| 5 | .02 | 2.00 | 93 | 3.92 |
| 6 | .03 | 3.00 | 94 | 4.01 |
| 7 | .06 | 6.00 | 96 | |
| 8 | .12 | 12.00 | 77 | 5.48 |

EXAMPLE III

Butadiene was polymerized in the manner outlined in Example I except that boron trifluoride phenolate was substituted for the boron trifluoride diethyl ether complex and the polymerization time was 21 hours for the present experiments. The results obtained are as follows:

| No. | $CS_2$ | $CS_2/Ni$ | Yield | DSV |
|---|---|---|---|---|
| 1 | None | | 100 | 2.9 |
| 2 | 0.0006 | 0.12 | 98.3 | 3.16 |
| 3 | 0.0010 | 0.20 | 93.5 | 3.38 |
| 4 | .0025 | 0.5 | 88.5 | 3.63 |
| 5 | .005 | 1.0 | 78.2 | 3.81 |
| 6 | .010 | 2.0 | 79.4 | 4.15 |
| 7 | .020 | 4.0 | 83.7 | 4.25 |

EXAMPLE IV

Butadiene was polymerized in a manner similar to that described in Example I except that the catalysts and their concentrations were: triethylaluminum=0.06 millimole, nickel octanoate=0.005 millimole, and boron trifluoride benzaldehyde complex=0.065 millimole per 10 grams of butadiene. Polymerization time was 21 hours in all instances. The results are as follows:

| No. | $CS_2$ | $CS_2/Ni$ | Yield | DSV |
|---|---|---|---|---|
| 1 | None | | 100 | 2.19 |
| 2 | 0.0006 | 0.12 | 97.3 | 3.23 |
| 3 | .0010 | 0.20 | 91.8 | 4.04 |
| 4 | .0025 | 0.50 | 86.3 | 4.07 |
| 5 | .005 | 1.00 | 78.8 | 4.25 |
| 6 | .010 | 2.00 | 60.5 | 4.65 |

EXAMPLE V

Butadiene was polymerized in a manner similar to that outlined in Example I except that the catalysts and their concentrations were: triethylaluminum=0.06 millimole, nickel octanoate=0.005 millimole and boron trifluoride benzophenone complex=0.10 millimole per 10 grams of butadiene. Polymerization time was 21 hours. The results are as follows:

| No. | $CS_2$ | $CS_2/Ni$ | Yield | DSV |
|---|---|---|---|---|
| 1 | None | | 97.8 | 2.35 |
| 2 | 0.0006 | 0.12 | 96.5 | 3.53 |
| 3 | .0010 | 0.2 | 96.3 | 3.67 |
| 4 | .0025 | 0.5 | 87.6 | 4.43 |

EXAMPLE VI

Butadiene was polymerized in a manner similar to that of Example I except that the concentration of the catalyst components was as follows: triethyl aluminum= 0.06 millimole; nickel octanoate 0.01 millimole; and the boron trifluoride diethyl ether complex was 0.075 millimole, all per 10 grams of butadiene. The results are given in the table below wherein column 1 is the experiment number; column 2 is the carbon disulfide concentration in millimoles per 10 grams of butadiene; column 3 is the yield or conversion in weight percent; column 4 is the polymerization time in hours and column 5 is the dilute solution viscosity.

| No. | $CS_2$ | Yield | Time | DSV |
|---|---|---|---|---|
| 1 | 0.00032 | 96.5 | 16 | 2.45 |
| 2 | 0.00065 | 95.8 | 16 | 2.81 |
| 3 | 0.0010 | 92.6 | 16 | 3.15 |
| 4 | 0.0023 | 84.3 | 19 | 3.68 |

Thus, there is illustrated that an increase in molecular weight is obtained when small amounts of carbon disulfide are added to a polymerization system employing an aluminum trialkyl, a nickel salt and a boron trifluoride complex.

While certain representative embodiments and details have been shown for the purpose of illustrating the invention, it will be apparent to those skilled in this art that various changes and modifications may be made therein without departing from the spirit or scope of the invention.

What is claimed is:

1. The method of polymerizing butadiene or butadiene in mixture with other diolefins to form polymers containing a high content of cis 1,4 addition which comprises polymerizing, under solution polymerization conditions, at least one material selected from the group consisting of butadiene and butadiene in mixture with other diolefins by means of a catalyst which is a mixture of (1) an organometallic compound in which the metal is selected from Groups I, II and III of the Periodic System, (2) at least one compound selected from the group consisting of nickel salts of carboxylic acids, organic complex compounds of nickel, nickel tetracarbonyl, cobalt salts of carboxylic acids, organic complex compounds of cobalt and dicobalt octacarbonyl, (3) at least one compound selected from the class consisting of boron trifluoride and complexes of boron trifluoride prepared by complexing boron trifluoride with at least one electron donating compound and (4) carbon disulfide.

2. In the method in which at least one material selected from the group consisting of butadiene and butadiene in mixture with other conjugated diolefins is polymerized under solution polymerization conditions with a catalyst system comprising (1) at least one organometallic compound in which the metal is selected from Groups I, II and II of the Periodic System, (2) at least one organometallic compound selected from the class of nickel salts of carboxylic acids, organic complex compounds of nickel, nickel tetracarbonyl, cobalt salts of carboxylic acids, organic complex compounds of cobalt and dicobalt octacarbonyl, and (3) at least one compound selected from the class consisting of boron trifluoride and boron trifluoride complexes prepared by complexing boron trifluoride with an electron donating compound to form polymers containing a high content of cis 1,4 addition, the said improvement which comprises the addition to said catalyst system of from about 0.05 to about 15.0 mole of carbon disulfide per mole of nickel or cobalt catalyst component.

3. The method according to claim 1 in which butadiene 1,3 alone is polymerized.

4. The method according to claim 1 in which the organometallic compound is selected from the group consisting of organoaluminum compounds, organomagnesium compounds, organozinc compounds and organolithium compounds and in which the organonickel compound is selected from the group consisting of nickel salts or carboxylic acids and organic complex compounds of nickel.

5. The method according to claim 1 in which the mole ratio of organometallic compound of the metals of Groups I, II and II/the organonickel or organocobalt compound ranges from about 0.3/1 to about 500/1, the mole ratio of the boron trifluoride or boron trifluoride complex/organonickel or organocobalt compound ranges from about 0.33/1 to about 300/1 and the mole ratio of the organometallic compound of Groups I, II and II/ boron trifluoride or boron trifluoride complex ranges from about 0.1/1 to about 4/1.

6. The method according to claim 2 in which the mole ratio of organometallic compound of the metals of Groups I, II and III/the organo nickel or organocobalt compound ranges from about 0.3/1 to about 500/1, the mole ratio of the boron trifluoride or boron trifluoride complex/organonickel or organocobalt compound ranges from about 0.33/1 to about 300/1 and the mole ratio of the organometallic compound of Groups I, II and III/ boron trifluoride or boron trifluoride complex ranges from about 0.1/1 to about 4/1.

7. The method according to claim 5 wherein the boron trifluoride complex is boron trifluoride complex of diethyl ether.

8. The method according to claim 5 wherein the boron trifluoride complex is boron trifluoride complex of phenol.

9. The method according to claim 6 wherein the boron trifluoride complex is boron trifluoride complex of benzophenone.

10. The method according to claim 6 wherein the boron trifluoride complex is boron trifluoride complex of phenol.

11. A catalyst composition suitable for the polymerization of butadiene or butadiene in mixture with other diolefins which comprises a mixture of (1) an organometallic compound in which the metal is selected from Groups I, II and II of the Periodic System, (2) at least one compound selected from the group consisting of nickel salts of carboxylic acids, organic complex compounds of nickel, nickel tetracarbonyl, cobalt salts of carboxylic acids, organic complex compounds of cobalt and dicobalt octacarbonyl, (3) at least one compound selected from the class consisting of boron trifluoride and complexes of boron trifluoride prepared by complexing boron trifluoride with at least one electron donating compound and (4) carbon disulfide.

References Cited

UNITED STATES PATENTS

| | | | |
|---|---|---|---|
| 2,977,349 | 3/1961 | Brockway et al. | 260—94.3 |
| 3,170,905 | 2/1965 | Ueda et al. | 260—94.3 |
| 3,170,907 | 2/1965 | Ueda et al. | 260—94.3 |
| 3,317,494 | 5/1967 | Farson | 260—82.1 |

FOREIGN PATENTS 662,850   5/1963   Canada.

JOSEPH L. SCHOFER, Primary Examiner

R. A. GAITHER, Assistance Examiner

U.S. Cl. X.R.

252—431; 260—82.1, 94.4

UNITED STATES PATENT OFFICE
CERTIFICATE OF CORRECTION

Patent No. 3,487,063        Dated December 30, 1969

Inventor(s) Morford C. Throckmorton and Carl E. Gordon

It is certified that error appears in the above-identified patent and that said Letters Patent are hereby corrected as shown below:

Column 1, line 57, "fluoride diethyl" should read -- fluoride·diethyl -- ;

Column 3, line 14, "$R_3Zn$" should read -- $R_2Zn$ -- ;

line 21, "components" should read -- compounds -- ;

line 71, "jalmitate" should read -- palmitate -- ;

Column 5, line 7, "mixtures or" should read -- mixtures of -- ;

Column 7, line 5, under $CS_2$, for No. 2, "0.025" should read -- .0025 -- .

SIGNED AND
SEALED
JUL 28 1970

(SEAL)
Attest:

Edward M. Fletcher, Jr.
Attesting Officer

WILLIAM E. SCHUYLER, JR.
Commissioner of Patents